United States Patent [19]

Kosugi

[11] 3,765,444

[45] Oct. 16, 1973

[54] CONTROL SYSTEM FOR OPENING AND CLOSING A BUTTERFLY VALVE

[76] Inventor: Yokinobu Kosugi, 995 Kamiwada, Yamato-shi, Japan

[22] Filed: July 6, 1972

[21] Appl. No.: 269,329

Related U.S. Application Data

[63] Continuation-in-part of Ser. No. 125,305, March 17, 1971, abandoned.

[30] Foreign Application Priority Data

Mar. 31, 1970 Japan.............................. 45/27131

[52] U.S. Cl. ............................................. 137/486
[51] Int. Cl. ........................................... F16k 31/36
[58] Field of Search ........................ 137/486, 487.5

[56] References Cited
UNITED STATES PATENTS

| | | | |
|---|---|---|---|
| 3,158,174 | 11/1964 | Stalnecker et al. .............. | 137/486 X |
| 3,369,561 | 2/1968 | Zimmerman et al. .............. | 137/486 |
| 3,548,865 | 12/1970 | Povinger............................. | 137/486 |

Primary Examiner—Henry T. Klinksiek
Attorney—Norman F. Oblon et al.

[57] ABSTRACT

A control system for opening and closing a butterfly valve rotatably mounted in a fluid channel is provided. The piston of a servo-motor is operatively connected to the butterfly valve through a weight member and will close the butterfly valve at either a rapid or a slow speed in accordance with the rate of flow of the fluid detected within the channel. The rapid or slow rate of closure is obtained by coupling a main pipe line and a manifold pipe line to a fluid contained tank and to the cylinder of the servo-motor. The main pipe line and the manifold pipe line are separately operative in accordance with valves attached thereto and the rate of closure control is provided by having the cross-sectional area of the main pipe line larger than that of the manifold pipe line so that a different rate of exhaustion of the fluid within the servo-motor will occur depending which line is utilized.

8 Claims, 5 Drawing Figures

PATENTED OCT 16 1973 3,765,444
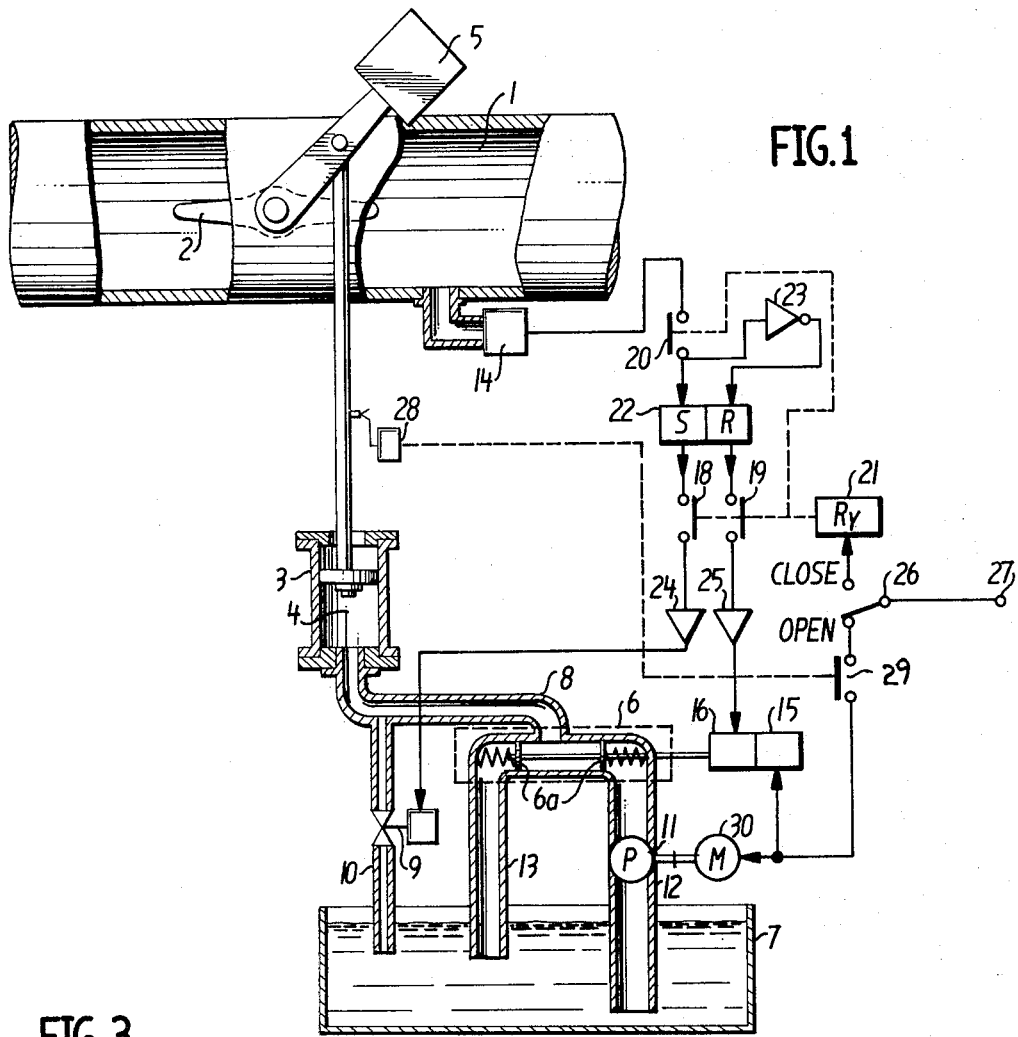
FIG. 1
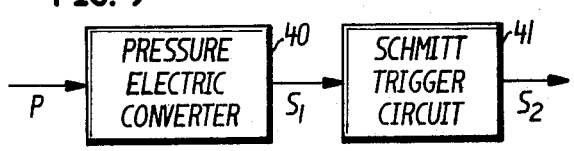
FIG. 3
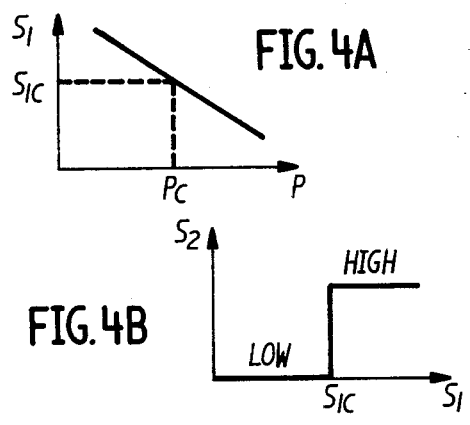
FIG. 4A
FIG. 4B
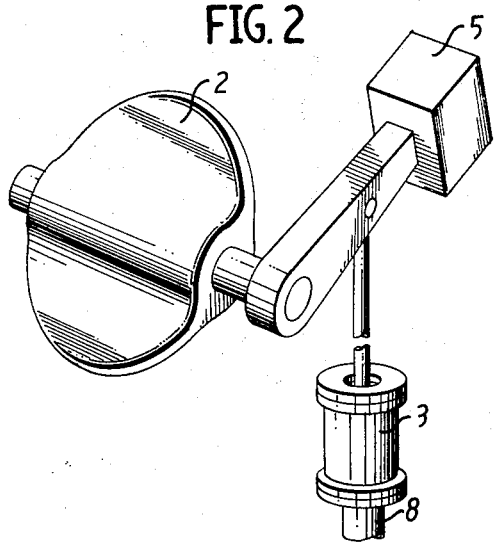
FIG. 2

CONTROL SYSTEM FOR OPENING AND CLOSING A BUTTERFLY VALVE

CROSS-REFERENCE TO RELATED APPLICATION

This application is a continuation-in-part of application Ser. No. 125,305, filed Mar. 17, 1971, now abandoned, for "A Control System For Opening and Closing a Butterfly Valve."

BACKGROUND OF THE INVENTION

1. Field Of The Invention

This invention generally relates to a control system for opening and closing a valve, and more particularly to a control system for closing a butterfly valve at either a high or a low speed.

2. Description Of The Prior Art

In the past, a butterfly valve located within a pressurized water channel would generally be subjected to a large closing torque from the pressurized water when the same was used to shut off the running water. Thus, because of the pressurized water, the butterfly valve once closed would only remain in a closed state for a period of several seconds. Such was found to be the case even if the valve was of a larger size.

One of the reasons that the water pressure would abnormally increase in the water channel was because of the rapid closing of the butterfly valve. In fact the rapid closing of the butterfly valve would often destroy the water channel and sometimes even cause injury to an operator nearby. A great need therefore existed to prevent the above described dangers.

In order to overcome the above drawbacks it was necessary to develope a system for enabling a valve to be closed gradually at a predetermined lower speed even when an emergency close is required.

SUMMARY OF THE INVENTION

Accordingly, it is one object of the present invention to provide a new and improved control system for opening and closing a valve.

Another object of this invention is to provide a new and improved unique control system for safely operating a butterfly valve without risk of damage to a fluid channel in which the butterfly valve is located or to nearby operators.

Still another object of this invention is to provide a new and improved unique control system for enabling a valve in a fluid channel to be closed either slowly or rapidly in accordance with the fluid rate of flow.

One other object of this invention is to provide a new and improved unique control system for closing a butterfly valve which employs a fluid operated servo-motor.

Briefly, in accordance with this invention the foregoing and other objects are attained by the provision of a butterfly valve rotatably mounted within a fluid channel. Means are provided for detecting the rate of flow of the fluid within the channel so that in accordance with the operation of a servo-motor and a pair of different sized pipe lines operatively connected thereto, the butterfly valve will close at different rates in accordance with the detected rate of flow.

BRIEF DESCRIPTION OF THE DRAWINGS

A more complete appreciation of the invention will be readily obtained as the same becomes better understood by reference to the following detailed description when considered in connection with the accompanying drawings wherein:

FIG. 1 shows an elevational view partly in section, of a control system for a butterfly valve according to this invention, FIG. 2 is a perspective view illustrating the driving mechanism of a butterfly valve according to this invention, FIG. 3 is a block diagram of a fluid flow speed detector suitable for use in the control system of FIG. 1, and FIG. 4a and 4b are graphs for explaining the operation of the fluid flow speed detector of FIG. 3.

DETAILED DESCRIPTION OF THE PREFERRED EMBODIMENTS

Referring now to the drawings wherein like reference numerals designate identical, or corresponding parts throughout the several views, and more particularly to FIG. 1 thereof wherein a valve 2, such as of the butterfly type is shown as being placed within a fluid channel 1. The fluid within the channel 1 may be water or the like. When the pressure within a lower chamber 4 of a servo-motor cylinder 3 is decreased, the butterfly valve 2 will be given a rotating torque by a weight 5 such that the butterfly valve 2 will close the channel 1. The pressure feed and drain line of the servo-motor cylinder 3 is shown as including a main line 8 which is coupled to a tank 7 through an electromagnetically operable pressure distributing valve 6 and a manifold line 10 which branches from the main line 8 and is coupled to the tank 7 through a conventional electromagnetic solenoid valve 9. The pressure distributing valve 6 has an inlet pipe line 12 connected to the tank 7 through a conventional motor operated pump 11 and an exhausting pipe line 13 which is connected directly to the tank 7 and has substantially the same cross sectional area as that of the main line 8. The cross sectional area of the manifold line 10 is made smaller than that of the main line 8 and exhausting pipe line 13. The pipe lines 12 and 13 are selectively connected to the main line 8 in accordance with the position of lands 6a within the valve 6. The lands 6a are moved by a rod which in turn is conventionally operated by a pair of solenoid coils 15 and 16. Initially or prior to operation of the butterfly valve 2, neither of the solenoids 15 or 16 will be energized and accordingly, the lands 6a will be in a neutral position such that neither of the pipe lines 12 or 13 will be able to communicate with the main pipe line 8. When one of the solenoids 15 or 16 is energized, as hereinafter explained, the lands 6a will be moved respectively in a rightward or leftward direction and the main pipe line 8 will communicate with a respective one of the pipe lines 12 or 13.

FIG. 2 is a perspective view which illustrates the driving mechanism of the butterfly valve according to this invention and should be referred to in connection with FIG. 1.

A conventional fluid-flow speed detector 14 is provided in the channel 1 at an upper stream to the butterfly valve 2 for enabling selective control of the valves 6 and 9 in response to the flow rate within the channel 1. By way of example, a pressure detector may be used for the fluid-flow speed detector 14, since the speed of a fluid flow can be readily obtained from the pressure of the fluid as easily understood from "Bernoulli's theorem." The detector 14 is arranged to generate a high or a low output when the pressure of the fluid in the channel 1 is respectively smaller or larger than a predetermined value (or when the speed of the fluid in the channel 1 is larger or smaller than a predetermined value).

Referring now to FIGS. 3 and 4a and 4b, it is seen that a detailed example of a detector 14 may include a conventional pressure-electric converter 40 whose output S1 responds to the pressure of the fluid within the channel 1 as shown. A conventional Schmitt trigger circuit 41 is connected to the output S1 of the pressure-electric converter 40. An output $S_2$ of the Schmitt trigger circuit 41 will change from a high to a low value (or vice versa) at the pressure $P_c$.

Referring again to FIG. 1, it is seen that the output signal line from the fluid flow speed detector 14 is connected to one terminal of a normally closed contact 20 of a conventional relay 21, as hereinafter set forth. The other terminal of the contact 20 is connected to a set input of a flip-flop circuit 22 and is also connected through a conventional inverter or polarity changer 23 to a reset input of the flip-flop circuit 22. The flip-flop 22 is arranged such that a high input at the set input terminal thereof will cause the flip-flop 22 to change from a reset state to a set state when the flip-flop 22 has been in a reset state and will cause no change in state when the flip-flop 22 has been in a set state. The flip-flop 22 is further arranged such that a high input at the reset input terminal of the flip-flop 22 will cause the flip-flop 22 to change from a set state to a reset state when the flip-flop 22 has been in a set state and will cause no change when the flip-flop 22 has been in a reset state. The set or reset output of the flip-flop 22 will be of a high value when the flip-flop circuit 22 is respectively in a set or reset state.

The set output terminal of the flip-flop 22 is connected to the electro-magnetic valve 9 through a normally open contact 18 of the relay 21 and a power amplifier 24. The valve 9 is open when the set output of the flip-flop 22 is of a high value provided that the contact 18 is closed. The reset output terminal of the flip-flop 22 is connected to the solenoid coil 16 through a normally open contact 19 of the relay 21 and a power amplifier 25. The coil 16 is energized when the reset output of the flip-flop 22 is of a high value provided that the contact 19 is closed.

A switch 26 having a movable contact is connected to a suitable power supply (not shown) of terminal 27. When the switch 26 is moved to a "CLOSE" position, the relay 21 will be energized so that the normally closed contact 20 will become open and that the normally opened contacts 18 and 19 will become closed.

There is further provided a conventional limit switch 28 which is operated to open a contact 29 thereof when the valve 2 is fully opened. Accordingly, when the switch 26 is moved to a "OPEN" position, the solenoid coil 15 and a motor 30 for driving the pump 11 will be energized provided that the contact 29 is closed.

Thus, for example, when it is desired to open the butterfly valve 2, the switch 26 is moved to the "OPEN" position so that an electrical control signal is supplied to the coil 15 of the valve 6 through the contact 29 whereby the main pipe line 8 will be allowed to communicate with the pipe line 12. At such time, the motor 30 is energized to drive the pump 11 so that a pressurized fluid, such as oil, within the tank 7 is supplied to the chamber 4 of the servo-motor 3 through the pipe line 12, the motor operated pump 11, the valve 6 and the main pipe line 8. It should be understood that under these conditions the solenoid valve 9 will remain in a closed state because the relay 21 is deenergized. When the pressurized fluid is supplied to the chamber 4, the piston of the servo-motor 3 will move upwards against the weight 5 and thereby open the butterfly valve 2. When the valve 2 becomes fully open, the limit switch 28 is actuated to open its contact 29 with result that the coil 15 is deenergized to cause the valve 6 to be in its neutral position. At the same time the motor 30 will be deenergized.

Now, when it is desired to close the butterfly valve 2, such as when the rate of fluid or water-flow in the channel 1 is at a relatively slow rate, the flip-flop 22 will be in a reset state by the output electrical signal from the flow speed detector 14 which is of a low value in response to slow speed indication. Under such conditions, when the switch 26 is moved to the "CLOSE" position, the relay 21 will be energized to open its contact 20 so that the reset state of the flip-flop circuit 22 will be kept if the output of the detector 14 changes to high value. At the same time, the contacts 18 and 19 are closed and thus the high value signal at the reset output of the flip-flop 22 will be communicated to the coil 16 of the valve 6 through the contact 19 and the power amplifier 25 whereby the main pipe line 8 will be communicated with the pipe line 13 and the fluid within the chamber 4 will be exhausted into the tank 7 along the aforesaid path which has a relatively low resistance against the flow of a fluid, such as oil. Accordingly, the piston of the servo-valve 3 will drop and the weight 5 will move so as to rapidly close the butterfly valve 2.

Although the contact 18 is closed, the set output of the flip-flop 22 is of a low value so that the valve 9 is not operated, i.e., the valve 9 remains in a closed state.

On the other hand, when the speed of water-flow remains relatively high, the detector 14 will generate a signal of a high value and thereby set the flip-flop 22. Thus, the set and reset outputs of the flip-flop 22 will respectively become of a high and low value. When the switch 26 is operated to the "CLOSE" position so that the contacts 18 and 19 are closed, the high value signal at the set output terminal of the flip-flop 22 will be transmitted through the contact 18 and the amplifier 24 to the solenoid valve 9 whereby the valve 9 will be opened. Although the contact 19 will be closed, the reset output of the flip-flop 22 will have a low signal and thus the solenoid 16 will not be energized. Accordingly, the fluid within the cylinder 4 of the servo-motor 3 will be exhausted through the manifold pipe line 10 into the tank 7. As previously explained, since the manifold pipe line 10 has a smaller cross section than that of the main pipe line 8, the desired time delay for exhausing the fluid within the servo-motor 3 will occur. Thus, the weight 5 will drop slowly and as a result thereof the butterfly valve 2 will rotate.

In addition the flow speed of the fluid in the channel will decrease as the valve 2 closes and accordingly the output signal of the speed detector 14 will change from a high to a low value. The contact 20, however, will be open so that the flip-flop 22 will not be caused to change its state, i.e., the flip-flop 22 will remain in its prior state. Thus, the flip-flop 22 will function as a memory device.

The closing operation of the butterfly valve 2 will be now described in connection with the closing of the guide-vane of a water turbine (not shown).

Under normal or properly functioning conditions, a closing operation will occur after the flow of water is stopped, such for example, as by closing the guide-vane of a water turbine downstream. Thus, when the water flow in the water channel 1 is substantially stopped, the water-flow speed detector 14 will transmit an operational signal to the pressure distributing valve 6 so as to connect the main line 8 to the low pressure line 13. During this period of time, the solenoid valve 9 will remain closed as described above. The pressurized fluid, such as oil, in the cylinder of the servo-motor 3 will then flow through the main pipe line 8, the pressure distributing valve 6, and the low pressure line 13, and into the tank 7. As the piston of the servo-motor 3 falls, the butterfly valve 2 will be given a rotating torque by the weight 5 and will close at a relatively high speed, since the cross sectional area of the pipe line 13 is large.

In the case where the water is flowing with a speed larger than a predetermined value through the channel 1, the water-flow speed detector 14 will detect the flow rate and generate a signal therefrom indicative thereof. The signal will cause the solenoid valve 9 to open and the pressure distributing valve 6 to remain closed so that the fluid in the servo-motor cylinder 3 will flow into the tank 7 through the manifold pipe line 10 having a small cross section. Thus, the flow of fluid to be exhausted from the cylinder of the servo-motor 3 is reduced to a slow rate so as to effectively and slowly close the butterfly valve 2 in spite of the existence of a large closing torque due to the water flow and that of the weight 5 such that no damage to the water channel will occur due to an abnormally excessive pressure which may be generated therein.

It should now be apparent that in accordance with the teachings of the present invention, the exhaust line of a servo-motor cylinder, which is used to open and close a butterfly valve, is divided into a main pipe line having a larger cross sectional area and a manifold pipe line having a smaller cross sectional area and that these lines can be selectively used in accordance with signals generated from a fluid flow speed detector so that even though the fluid speed within a water turbine or the like is high, it is possible to slowly close the butterfly valve so as to prevent the generation of abnormal fluid pressure in the fluid channel.

Obviously, numerous modifications and variations of the present invention are possible in light of the above teachings. Thus, for example, while the fluid flow speed detector 14 has been described as being of the pressure-electric converter type other detectors, such as of the electro-magnetic type, could be used. It is therefore to be understood that within the scope of the appended claims the invention may be practiced otherwise than as specifically described herein.

What is claimed as new and desired to be secured by letters patent of the United States is:

1. A control system for opening and closing a valve in a fluid channel comprising:
    a valve rotatably mounted in a fluid channel;
    means for detecting the rate of flow within said fluid channel; and,
    means responsive to said detected rate of flow for slowly closing said valve if the rate of fluid flow is more than a predetermined value and for rapidly closing said valve if the rate of fluid flow is less than said predetermined value.

2. A control system as in claim 1 wherein said valve is of the butterfly type.

3. A control system as in claim 1 wherein said means responsive to said detected rate of flow includes:
    a servo-motor for opening and closing said valve as a pressurized fluid is fed to or drained from the cylinder thereof;
    a first pipe line having a given cross-sectional area;
    a second pipe line having a given cross sectional area smaller than that of said first pipe line;
    a first valve for controlling fluid flow from said servo-motor through said first pipe line to a tank;
    a second valve for controlling fluid flow from said servo-motor through said second pipe line to said tank; and
    wherein said first valve will become operative to rapidly allow said rotatably mounted valve to close upon the detection of a given rate of flow and wherein said second valve will become operative to slowly allow said rotatably mounted valve to close upon the detection of a different rate of flow.

4. A control system as in claim 3 wherein said first valve is of the pressure distributing type.

5. A control system as in claim 4 wherein said first valve includes a pair of lands which are both connected to a moveable rod for enabling the simultaneous movement thereof.

6. A control system as in claim 3 wherein said second valve is of the electromagnetic solenoid type.

7. A control system for opening and closing of butterfly valve comprising:
    a butterfly valve rotatably mounted in a fluid channel and for opening and closing the same;
    a servo-motor for opening and closing said butterfly valve as a pressurized fluid is fed to or drained from the cylinder thereof;
    a main pipe line having a large cross sectional area and leading said fluid from said cylinder of said servo-motor to a tank through a first valve;
    a manifold pipe line having a small cross sectional area and branching from said main pipe and led to said tank through a second valve; and
    a fluid-flow speed detector located upstream from said butterfly valve;
    whereby, if the speed of fluid flow detected by said fluid-flow speed detector is more than a predetermined value, a signal from said detector will open only said second valve to cause an exhaustion of fluid in said cylinder of said servo-motor to be effected through said manifold pipe line to thereby slowly close said butterfly valve; and
    if the speed of fluid flow is less than said predetermined value, only said first valve will open to cause an exhaustion of fluid in said cylinder of said servo-motor to be effected through the main pipe line to thereby rapidly close said butterfly valve.

8. A control system as in claim 7 wherein said fluid-flow speed detector includes:
    a pressure-electric converter for detecting the pressure of the fluid flowing within said fluid channel and for converting the same into a corresponding electrical signal, and
    a Schmitt trigger circuit connected to said pressure-electric converter for providing one output value if said detector fluid speed is more than said predetermined value and for providing a second value if said detected fluid speed is less than said predetermined value.

* * * * *